(12) United States Patent
Becker et al.

(10) Patent No.: US 12,044,787 B2
(45) Date of Patent: Jul. 23, 2024

(54) METHODS AND SYSTEMS FOR DETERMINING A DIRECTION OF ARRIVAL OF A RADAR DETECTION

(71) Applicant: Aptiv Technologies AG, Schaffhausen (CH)

(72) Inventors: Adrian Becker, Leverkusen (DE); Anton Feldmann, Wuppertal (DE); Arne Grumpe, Essen (DE); Markus Stefer, Remscheid (DE)

(73) Assignee: Aptiv Technologies AG, Schaffhausen (CH)

( * ) Notice: Subject to any disclaimer, the term of this patent is extended or adjusted under 35 U.S.C. 154(b) by 385 days.

(21) Appl. No.: 17/513,797

(22) Filed: Oct. 28, 2021

(65) Prior Publication Data

US 2022/0137174 A1 May 5, 2022

(30) Foreign Application Priority Data

Nov. 2, 2020 (EP) .................................... 20205146

(51) Int. Cl.
*G01S 3/04* (2006.01)
*G06N 3/047* (2023.01)
*G06N 3/048* (2023.01)
*G06N 20/00* (2019.01)

(52) U.S. Cl.
CPC .............. *G01S 3/043* (2013.01); *G06N 3/047* (2023.01); *G06N 3/048* (2023.01); *G06N 20/00* (2019.01)

(58) Field of Classification Search
CPC ............. G01S 13/42; G01S 2013/0245; G01S 2013/9318; G01S 2013/93185; G01S 2013/9319; G01S 3/043; G06N 20/00; G06N 3/047; G06N 3/048
See application file for complete search history.

(56) References Cited

U.S. PATENT DOCUMENTS

| 6,873,251 | B2 | 3/2005 | Schiffmann et al. |
| 9,983,301 | B2 | 5/2018 | Liu et al. |
| 2016/0223651 | A1 | 8/2016 | Kamo et al. |
| 2018/0082137 | A1 | 3/2018 | Melvin et al. |
| 2018/0341017 | A1 | 11/2018 | Kamo et al. |

(Continued)

FOREIGN PATENT DOCUMENTS

| WO | 2020113160 | 6/2020 |
| WO | 2020113166 | 6/2020 |
| WO | 2020146428 | 7/2020 |

OTHER PUBLICATIONS

"Extended European Search Report", EP Application No. 20205146.2, Apr. 26, 2021, 8 pages.

(Continued)

*Primary Examiner* — Timothy X Pham
(74) *Attorney, Agent, or Firm* — Harness, Dickey & Pierce, P.L.C.

(57) ABSTRACT

A computer implemented method for determining a direction of arrival of a radar detection comprises the following steps carried out by computer hardware components: acquiring a complex-valued beamvector of the radar detection; processing the complex-valued beamvector by a machine learning module in the complex domain; and obtaining the direction of arrival as an output of the machine learning module.

17 Claims, 7 Drawing Sheets

(56) References Cited

U.S. PATENT DOCUMENTS

| | | |
|---|---|---|
| 2020/0225321 A1 | 7/2020 | Kruglick et al. |
| 2023/0160996 A1* | 5/2023 | Murakami ............ G01S 13/003 342/146 |

OTHER PUBLICATIONS

"Extended European Search Report", EP Application No. 20187674. 5, Dec. 4, 2020, 11 pages.

"Frequency-Modulated Continuous-Wave Radar (FMCW Radar)", Retrieved at: https://www.radartutorial.eu/02.basics/Frequency%20Modulated%20Continuous%20Wave%20Radar.en.html—on Jul. 23, 2021, 6 pages.

Adavanne, et al., "Direction of Arrival Estimation for Multiple Sound Sources Using Convolutional Recurrent Neural Network", Aug. 5, 2018, 6 pages.

Bengtsson, "Models for tracking in automotive safety systems", Licentiate thesis, 2008, Jan. 2008, 189 pages.

Bialer, et al., "Performance Advantages of Deep Neural Networks for Angle of Arrival Estimation", Feb. 17, 2019, 5 bages.

Brooks, et al., "Complex-valued neural networks for fully-temporal micro-Doppler classification", Jun. 2019, 10 pages.

Jonas, et al., "Single-Snapshot Direction-of-Arrival Estimation of Multiple Targets Using a Multi-Layer Perceptron", Apr. 15, 2019, 4 pages.

Kederer, et al., "Direction of arrival (DOA) determination based on monopulse concepts", Feb. 2000, 5 pages.

Kellner, "Instantaneous Full-Motion Estimation of Arbitrary Objects using Dual Doppler Radar", Jun. 2014, 6 pages.

Kellner, et al., "Tracking of Extended Objects with High Resolution Doppler Radar", Dec. 2015, 13 pages.

Krim, "Two Decades of Array Signal Processing Research: The Parametric Approach", Jul. 1996, pp. 67-94.

Liu, et al., "Direction-of-Arrival Estimation Based on Deep Neural Networks With Robustness to Array Imperfections", Oct. 2018, 13 pages.

Mandic, et al., "Why a Complex Valued Solution for a Real Domain Problem", Sep. 2007, pp. 384-389.

Monning, et al., "Evaluation of Complex-Valued Neural Networks on Real-Valued Classification Tasks", Nov. 29, 2018, 18 pages.

Scardapane, et al., "Complex-Valued Neural Networks with Nonparametric Activation Functions", Feb. 22, 2018, 12 pages.

Schlichenmaier, et al., "Clustering of Closely Adjacent Extended Objects in Radar Images using Velocity Profile Analysis", Apr. 2019, 5 pages.

Schlichenmaier, et al., "Instantaneous Actual Motion Estimation with a Single High-Resolution Radar Sensor", Apr. 2018, 5 pages.

Swindlehurst, et al., "Application of Music to Arrays With Multiple Invariances", Jun. 2000, pp. 3057-3060.

Terabayashi, "Ultrawideband Direction-of-Arrival Estimation Using Complex-Valued Spatiotemporal Neural Networks", Sep. 2014, pp. 1727-1732.

* cited by examiner

METHODS AND SYSTEMS FOR DETERMINING A DIRECTION OF ARRIVAL OF A RADAR DETECTION

CROSS-REFERENCE TO RELATED APPLICATION

This application claims priority to European Patent Application Number 20205146.2, filed Nov. 2, 2020, the disclosure of which is hereby incorporated by reference in its entirety herein.

BACKGROUND

Detecting incidence angles of received radar signals is an important task in various applications, in particular for at least partially autonomously driving vehicles.

Accordingly, there is a need to provide improved methods for detecting incidence angles of received radar signals.

SUMMARY

The present disclosure relates to methods and systems for determining a direction of arrival of a radar detection. The present disclosure provides a computer implemented method, a computer system, and a non-transitory computer readable medium according to the independent claims. Embodiments are given in the subclaims, the description and the drawings.

In one aspect, the present disclosure is directed at a computer implemented method for determining a direction of arrival of a radar detection, the method comprising the following steps performed (in other words: carried out) by computer hardware components: acquiring a complex-valued beamvector of the radar detection; processing the complex-valued beamvector by a machine learning module in the complex domain; and obtaining the direction of arrival as an output of the machine learning module.

In other words, a network for processing complex valued radar antenna array response may be provided. In other words, a complex valued neural network for direction of arrival estimation may be provided.

According to another aspect, the machine learning module comprises a plurality of dense layers.

According to another aspect, each of the plurality of dense layers is followed by a respective complex activation function.

According to another aspect, the machine learning module further comprises a further dense layer.

According to another aspect, the further dense layer is followed by at least one of a square layer, a convolution layer, or a real activation function.

With the methods as described herein, a machine learning module (for example an (artificial) neural network) may optimize an objective function w.r.t. (with respect to) the networks learnable parameters. Since the minimum value of a function or series in the complex domain may not be well defined, the objective function may be expressed in the real domain. With the methods as described herein, the data may be processed in the complex domain to extract as much information as possible (especially phase-relations). In order to formulate an objective function, mapping (for example combining magnitude and phase information of the complex numbers) from complex to real domain may be provided. This mapping may be followed by one or more real-valued convolutions and real-valued activations, but the complex to real mapping (e.g. abs-square) may also be preceded by one or more complex-valued convolutions. It will be understood that the operations in the complex domain are not limited to dense layers.

According to another aspect, the computer implemented method further comprises the following step carried out by the computer hardware components: determining a plurality of phase differences based on the complex-valued beamvector.

According to another aspect, the plurality of phase differences are determined for antennas spaced apart a pre-determined distance and for antennas space apart at least substantially 50% more than the pre-determined distance.

According to another aspect, the computer implemented method further comprises the following step carried out by the computer hardware components: expanding a plurality of angles based on the plurality of phase differences, for example using a shared MLP (multilayer perceptron).

According to another aspect, the further dense layer is followed by a square layer; and the computer implemented method further comprises the following step carried out by the computer hardware components: combining the output of the square layer and the plurality of expanded angles. The combining may for example include expanding dimensions (to match the dimensions of the output of the square layer and the plurality of expanded angles) and then concatenating the data of same dimension.

According to another aspect, the machine learning module further comprises at least one of a convolution layer, a real activation function, and a dense combination layer.

According to another aspect, the machine learning module further comprises a probability-like activation function.

In another aspect, the present disclosure is directed at a computer system, said computer system comprising a plurality of computer hardware components configured to carry out several or all steps of the computer implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle comprising the computer system as described herein and a radar sensor.

According to another aspect, the radar sensor comprises a plurality of antennas, wherein at least some of the antennas are spaced a pre-determined distance apart and at least some of the antennas are spaced at least substantially 50% more than the pre-determined distance apart.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

In order to localize the objects belonging to radar reflections, the incidence angle of received EM (electromagnetic) waves needs to be determined.

According to various embodiments, neural networks may be provided in a way which respects the underlying complex domain and outperforms existing real valued methods.

Figure 1:
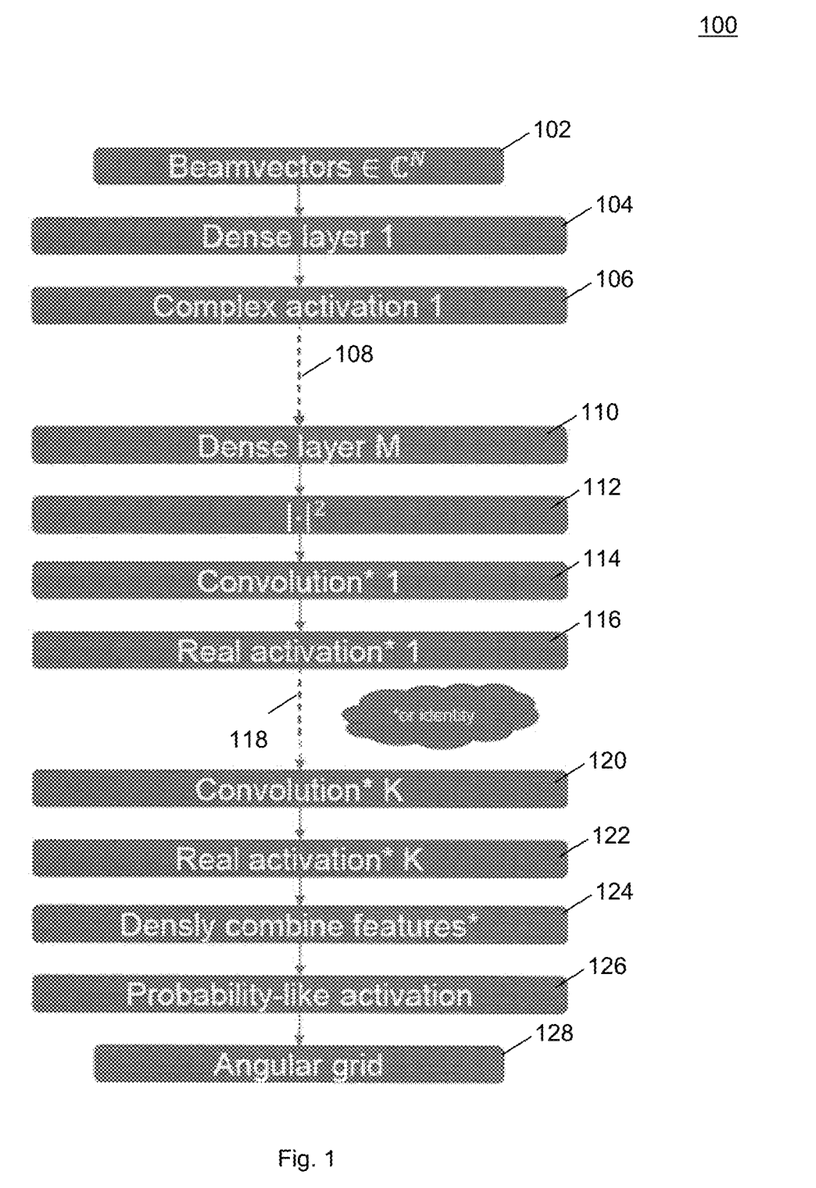
FIG. 1 an architecture of a machine learning module according to various embodiments.

FIG. 1 shows an architecture 100 of a machine learning module (for example artificial neural network) according to various embodiments with M densely connected complex valued layers followed by K convolutions 120 whose kernels may be set to identity.

The network input may be a complex valued antenna array response (further called beamvector) 102 which may have been multiplied by a calibration matrix to correct for production imperfections. Although neural networks are also capable of learning the calibration, the calibration may be applied to generalize better, as the calibration is unique to every unit.

The beamvectors 102 may be processed by one or more densely connected layers computing the inner product of the complex valued input and a complex valued weight matrix which may be optimized during training. A complex valued non-linear activation function is applied to the result of every inner product operation.

For example, complex-valued beam vectors 102 may be provided to a first dense layer 104, which may be followed by a first complex activation function 106. Further dense layers, each of which may be followed by a further complex activation may be provided, like indicated by dots 108.

Defining an activation function for complex valued inputs is not a trivial task, as it should consider phase and absolute value of the input. According to various embodiments, a model with the complex cardioid (Eq. 1) as activation function may be used:

$$f(\bar{z}) = \tfrac{1}{2}\bar{z}(1+\cos(\varphi(\bar{z}))) \quad (1)$$

The complex cardioid attenuates the complex value $\bar{z}$ with subject to its phase $\varphi(\bar{z})$. After those one or more densely connected layers, a last densely connected layer (in other words: a further dense layer) 110 without an activation function may be applied. The squared absolute values 112 of this layer's output may be calculated, which can be considered as an activation function that transfers the data from complex to real domain. This output may then be processed by operations in real domain e.g. one or more convolutional layers 114, 120 to refine the output and achieve positional invariant encoding. Each convolution layer 114, 120 may be followed by a real activation function 116, 122. Further convolution layers followed by a real activation function may be provided, like indicated by dots 118.

The box "densely combine features" 124 is used to combine the features learned by the convolutions (in case they are not set to identity).

A last activation function 126 (for example softmax or sigmoid) may generate probability-like values for each output neuron, which corresponds to an angle of arrival, which may be provided in an angular grid 128. The angular grid 128 may be the output of the network (in other words: the angular grid 128 may be the classification result). The angular grid 128 may be interpreted as the probability that a target reflects from a distinct angle which is represented by the individual bins of the angular grid 128.

According to various embodiments, a complex valued neural network for direction of arrival (DoA) estimation with sub-Nyquist sampled phased arrays may be provided.

In order to apply classical methods for DoA estimation, a uniformly sampled linear array respecting the Nyquist criterion is required. This means the array elements need to be spaced at least by $\lambda/2$ (where $\lambda$ is the wavelength of the signal) to sample the signal without ambiguities. For larger spacings, the determination of the DoA may become ambiguous.

Figure 2:
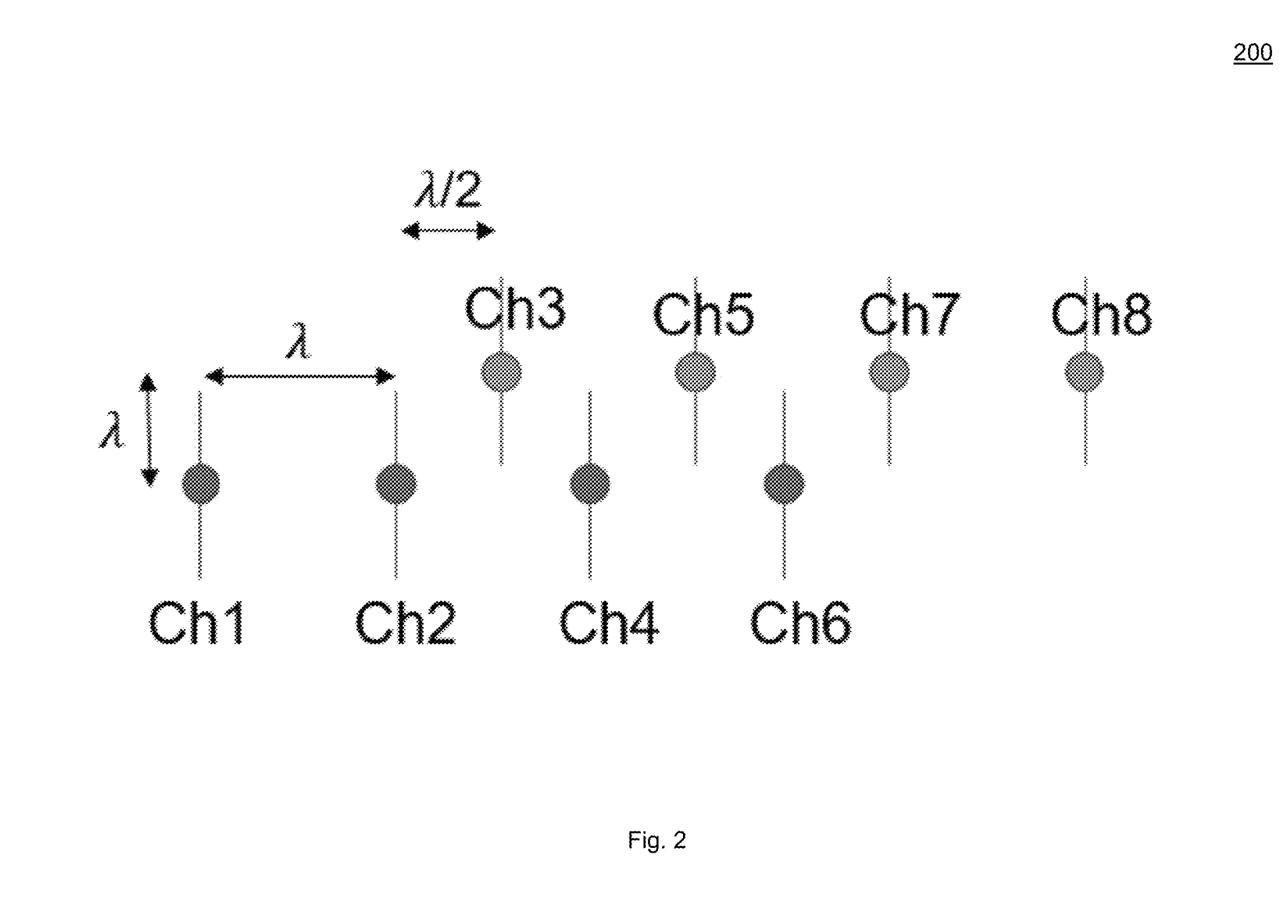
FIG. 2 an illustration of a short-range radar virtual antenna array layout.

FIG. 2 shows an illustration 200 of a short-range radar virtual antenna array layout.

Figure 3:
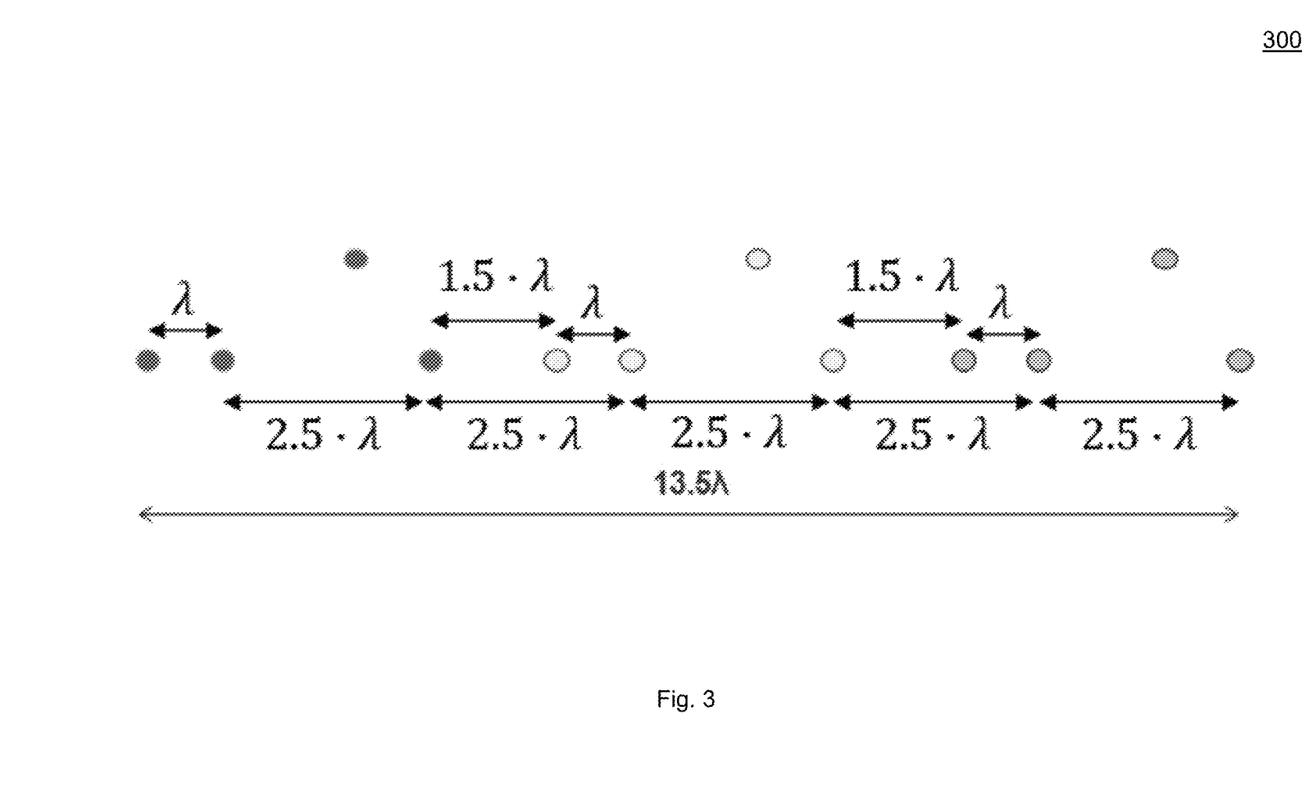
FIG. 3 an illustration of a mid-range radar virtual antenna array layout.

FIG. 3 shows an illustration 300 of a mid-range radar virtual antenna array layout.

Figure 4:
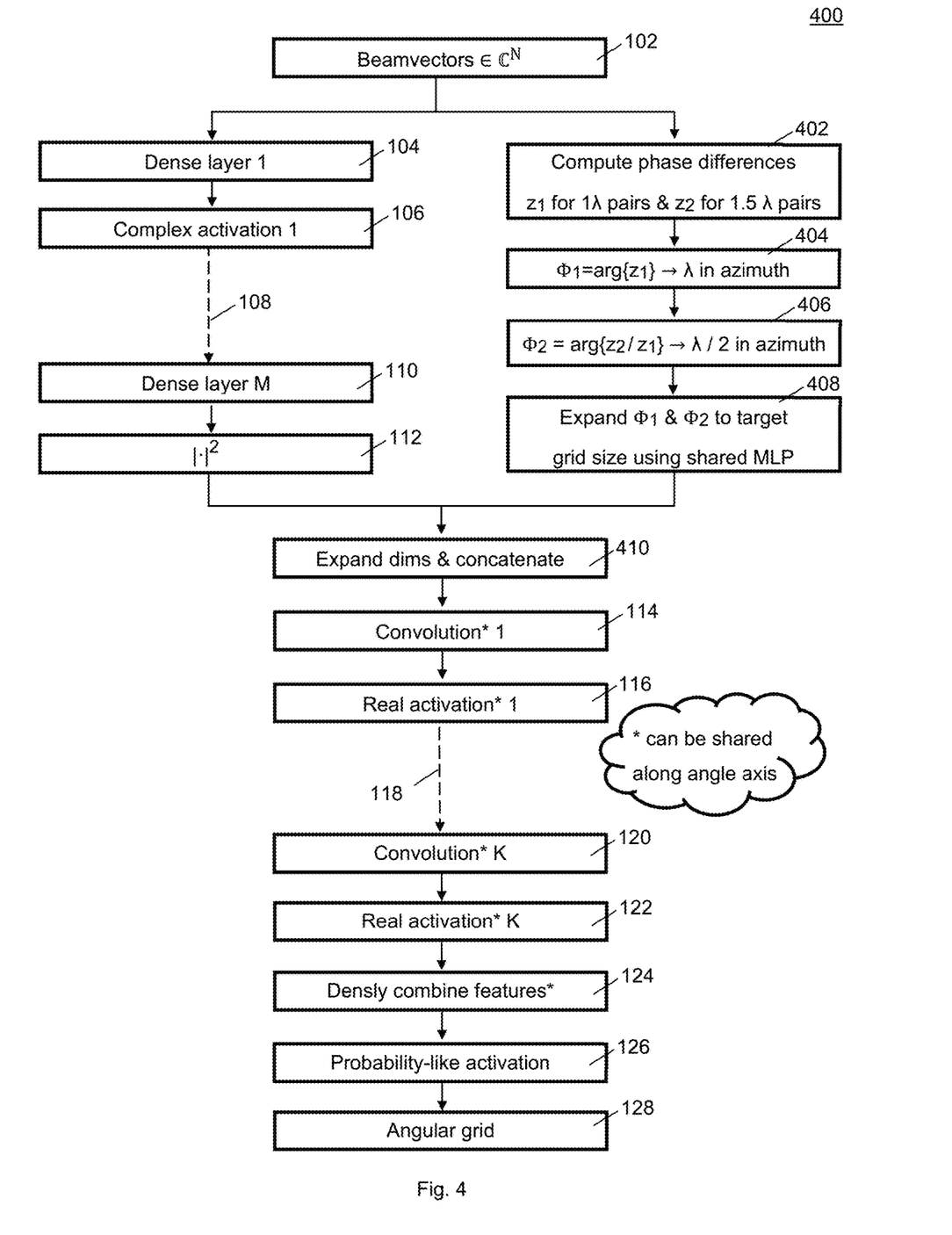
FIG. 4 an architecture of a machine learning module according to various embodiments.

FIG. 4 shows an architecture 400 of a machine learning module according to various embodiments. Various portions of FIG. 4 may be similar or identical to the architecture 100 shown in FIG. 1, so that the same reference signs may be used, and duplicate description may be omitted.

The beamvectors 102 may be provided to a first dense layer 104 (like in the network shown in FIG. 1), and for processing in the left branch shown in FIG. 4. Furthermore, the beamvectors 102 may be provided for processing in the right branch (402, 404, 406, 408) of FIG. 4.

As a first preprocessing step, the virtual array needs to be collapsed so all elements lie on a line (the three vertically shifted elements in FIG. 3 need to be moved down). Afterwards, all $\lambda$ spaced pairs may be collected and all 1.5$\lambda$ spaced pairs may be collected, and the phase differences between the pairs may be computed (402).

The complex numbers containing the phase differences of the $\lambda$ spaced pairs will be further called $z_1$ and $z_2$ for the complex numbers containing the phase differences of the $\lambda$ and 1.5$\lambda$ spaced pairs, respectively. In 404, $\Phi_1$ may be determined as the argument of the complex numbers in $z_1$ and may contain the real valued phase differences of the lambda spaced pairs. In 406, $\Phi_2$ may be determined as the argument of modified complex numbers derived from both $z_1$ and $z_2$, resulting in real valued phase differences from (virtual) $\lambda/2$ spaced pairs. This may be achieved by dividing $z_2$ by $z_1$. As a last step, in 408, $\Phi_1$ and $\lambda/2$ may be expanded to the size of the target angular grid. Thus, a multilayer perceptron (MLP) may be applied which shares the weights for $\Phi_1$ and $\Phi_2$ in order to ensure that both vectors will be expanded in the same manner.

The expanded vectors from the "phase comparison"-like path (402, 404, 406, 408) may enable the network to learn to pay attention to particular regions in the power spectrum-like vector from the left path (104, 106, 108, 110, 112) of the network. The results from the left path and the results from the right path may be expanded in their dimensions and concatenated (410).

One or more convolutions 114, 120 may be applied to the three vectors stacked together, whose weights can be shared along the angular dimension. A last real valued dense layer 124 combines the features generated by the convolutions followed by an activation function 126 which yields the desired probability-like values.

Figure 5:
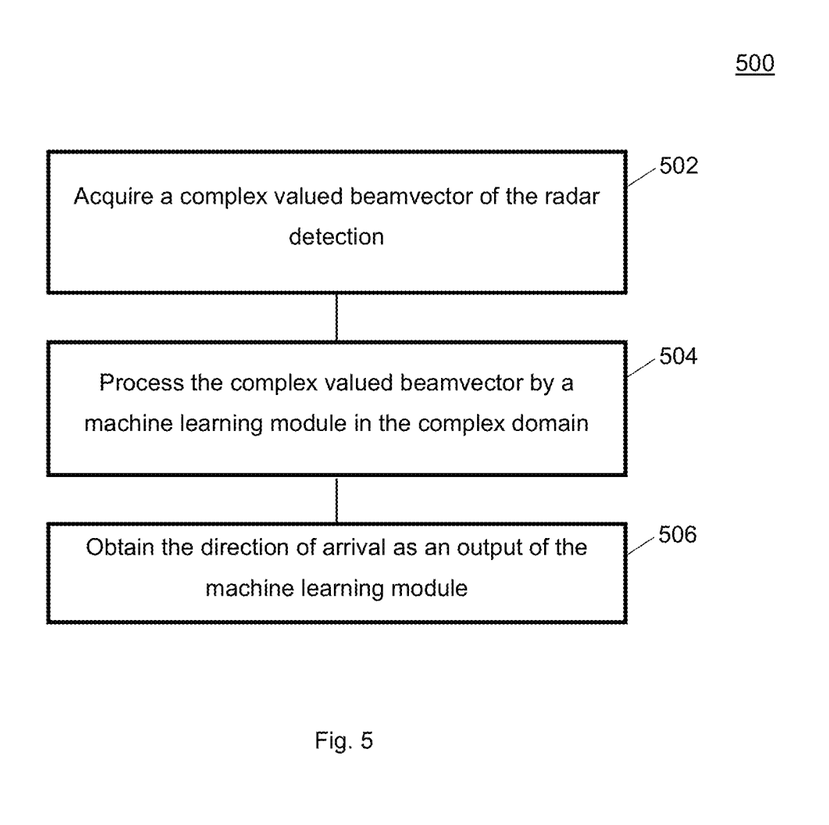
FIG. 5 a flow diagram illustrating a method for determining a direction of arrival of a radar detection according to various embodiments.

FIG. 5 shows a flow diagram 500 illustrating a method for determining a direction of arrival of a radar detection according to various embodiments. At 502, a complex-valued beamvector of the radar detection may be acquired. At 504, the complex-valued beamvector may be processed by a machine learning module in the complex domain. At 506, the direction of arrival may be obtained as an output of the machine learning module.

According to various embodiments, the machine learning module may include a plurality of dense layers.

According to various embodiments, each of the plurality of dense layers may be followed by a respective complex activation function.

According to various embodiments, the machine learning module may further include a further dense layer.

According to various embodiments, the further dense layer may be followed by at least one of a square layer, a convolution layer, or a real activation function.

According to various embodiments, the method may further include determining a plurality of phase differences based on the complex-valued beam-vector.

According to various embodiments, the plurality of phase differences are determined for antennas spaced apart a pre-determined distance and for antennas space apart at least substantially 50% more than the pre-determined distance.

According to various embodiments, the method may further include expanding a plurality of angles based on the plurality of phase differences.

According to various embodiments, the further dense layer is followed by a square layer, and the method may further include combining the output of the square layer and the plurality of expanded angles.

According to various embodiments, the machine learning module may further include at least one of a convolution layer, a real activation function, and a dense combination layer.

According to various embodiments, the machine learning module may further include a probability-like activation function.

Each of the steps 502, 504, 506 and the further steps described above may be performed by computer hardware components.

Figure 6:
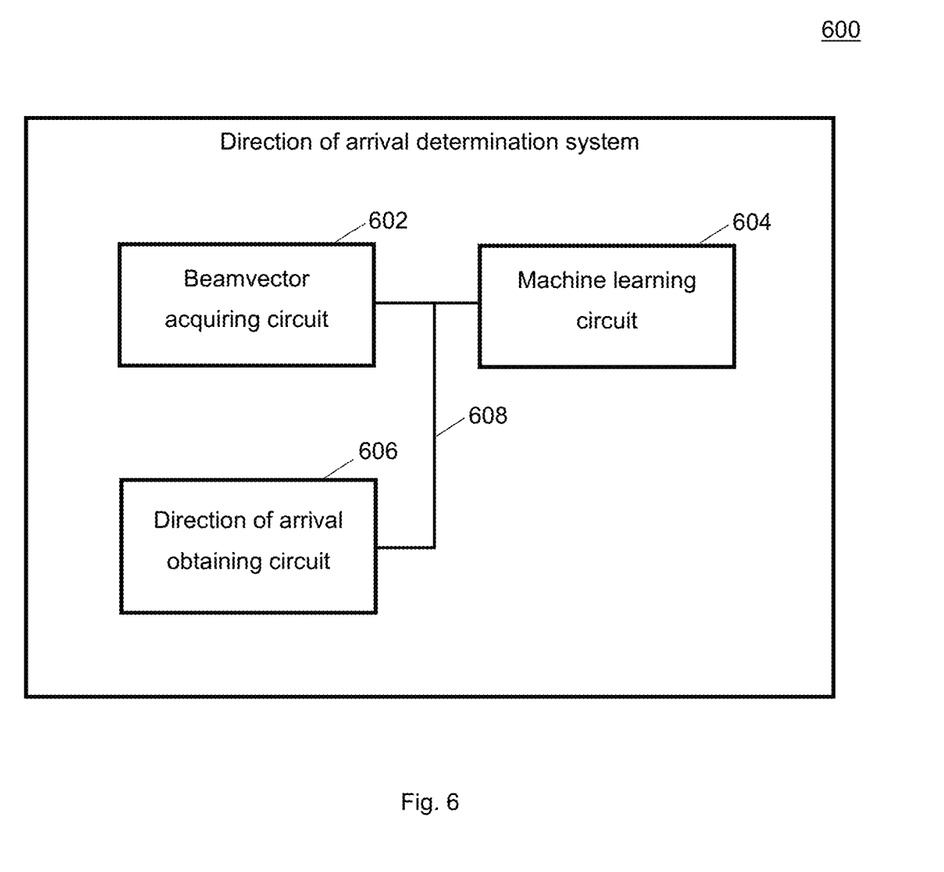
FIG. 6 a direction of arrival determination system according to various embodiments.

FIG. 6 shows a direction of arrival determination system 600 according to various embodiments. The direction of arrival determination system 600 may include a beamvector acquiring circuit 602, a machine learning circuit 604, and a direction of arrival obtaining circuit 606.

The beamvector acquiring circuit 602 may be configured to acquire a complex-valued beamvector of a radar detection. The machine learning circuit 604 may be configured to processing the complex-valued beamvector in the complex domain. The direction of arrival obtaining circuit 606 may be configured to obtain the direction of arrival as an output of the machine learning module.

The beamvector acquiring circuit 602, the machine learning circuit 604, and the direction of arrival obtaining circuit 606 may be coupled with each other, e.g. via an electrical connection 608, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 7:
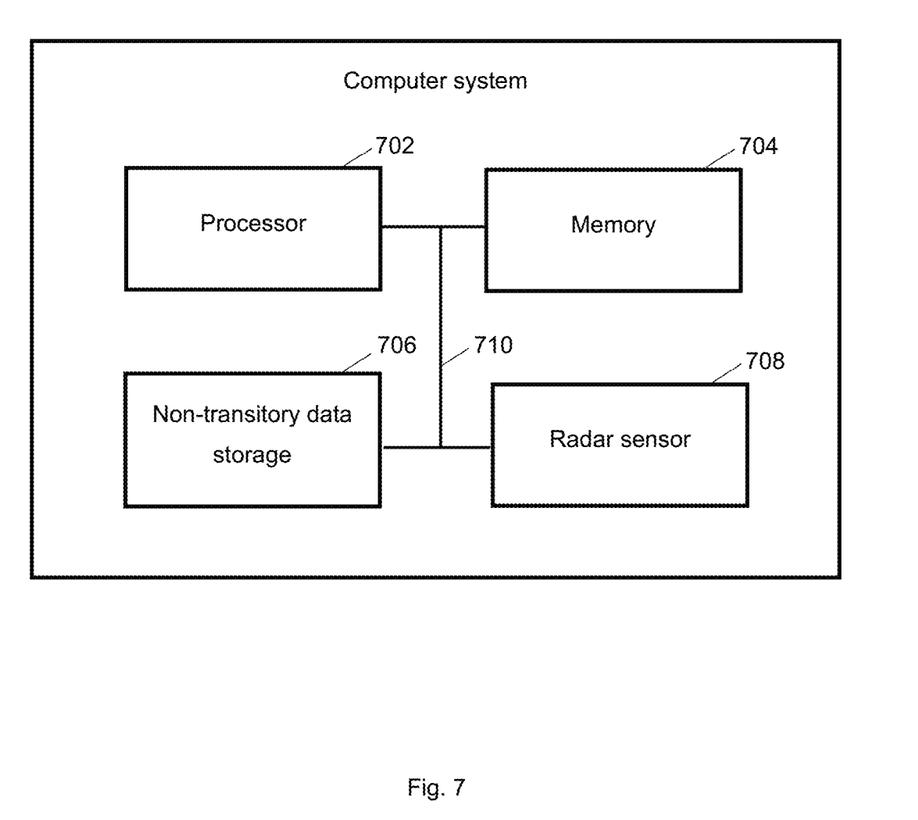
FIG. 7 a computer system with a plurality of computer hardware components configured to carry out steps of a computer implemented method for determining a direction of arrival of a radar detection according to various embodiments.

FIG. 7 shows a computer system 700 with a plurality of computer hardware components configured to carry out steps of a computer implemented method for determining a direction of arrival of a radar detection according to various embodiments. The computer system 700 may include a processor 702, a memory 704, and a non-transitory data storage 706. A radar sensor 708 may be provided as part of the computer system 700 (like illustrated in FIG. 7) or may be provided external to the computer system 700.

The processor 702 may carry out instructions provided in the memory 704. The non-transitory data storage 706 may store a computer program, including the instructions that may be transferred to the memory 704 and then executed by the processor 702. The radar sensor 708 may acquire radar measurements, based on which complex-valued beamvectors may be determined.

The processor 702, the memory 704, and the non-transitory data storage 706 may be coupled with each other, e.g. via an electrical connection 710, such as e.g. a cable or a computer bus or via any other suitable electrical connection to exchange electrical signals. The radar sensor 708 may be coupled to the computer system 700, for example via an external interface, or may be provided as parts of the computer system (in other words: internal to the computer system, for example coupled via the electrical connection 710).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the direction of arrival determination system 600 and/or for the computer system 700.

What is claimed is:

1. A method of operating a radar system, the method comprising:
   acquiring, from a radar sensor, a complex-valued beamvector of a radar detection;
   processing the complex-valued beamvector by a machine learning module in a complex domain, the processing including,
   determining, based on the complex-valued beamvector, a plurality of phase differences for antennas spaced apart a pre-determined distance and for antennas spaced apart at least substantially fifty percent more than the pre-determined distance, expanding a plurality of angles based on the plurality of phase differences such that outputs of a layer included in the machine learning module have a same dimension as the plurality of angles, and combining the output of the layer and the plurality of angles; and obtaining a direction of arrival as an output of the machine learning module.

2. The method of claim 1, wherein the machine learning module comprises a plurality of dense layers.

3. The method of claim 2, wherein each of the plurality of dense layers is followed by a respective complex activation function.

4. The method of claim 3, wherein the machine learning module further comprises a further dense layer.

5. The method of claim 4, wherein the further dense layer is followed by at least one of a square layer, a convolution layer, or a real activation function.

6. The method of claim 5, wherein
the further dense layer is followed by the square layer, and
the combining includes combining the output of the square layer and the plurality of angles.

7. The method of claim 1, wherein the machine learning module further comprises at least one of a convolution layer, a real activation function, or a dense combination layer.

8. The method of claim 1, wherein the machine learning module further comprises a probability-like activation function.

9. The method of claim 1, wherein the plurality of angles are expanded by applying a multilayer perceptron (MLP) that shares weights between the plurality of angles.

10. A vehicle comprising:
a radar sensor; and
a computer system configured to:
acquire, from the radar sensor, a complex-valued beamvector of a radar detection;
process the complex-valued beamvector by a machine learning module in a complex domain including,
determining, based on the complex-valued beamvector, a plurality of phase differences for antennas spaced apart a pre-determined distance and for antennas spaced apart at least substantially fifty percent more than the pre-determined distance,
expanding a plurality of angles based on the plurality of phase differences such that outputs of a layer included in the machine learning module have a same dimension as the plurality of angles, and
combining the output of the layer and the plurality of angles; and
obtain a direction of arrival as an output of the machine learning module.

11. The vehicle of claim 10, wherein the machine learning module comprises a plurality of dense layers.

12. The vehicle of claim 11, wherein each of the plurality of dense layers is followed by a respective complex activation function.

13. The vehicle of claim 12, wherein the machine learning module further comprises a further dense layer.

14. The vehicle of claim 13, wherein the further dense layer is followed by at least one of a square layer, a convolution layer, or a real activation function.

15. The vehicle of claim 10, wherein the plurality of angles are expanded by applying a multilayer perceptron (MLP) that shares weights between the plurality of angles.

16. A non-transitory computer readable media comprising computer-executable instructions that, when executed, cause a computer system to:
acquire a complex-valued beamvector of a radar detection;
process the complex-valued beamvector by a machine learning module in a complex domain including,
determining, based on the complex-valued beamvector, a plurality of phase differences for antennas spaced apart a pre-determined distance and for antennas spaced apart at least substantially fifty percent more than the pre-determined distance,
expanding a plurality of angles based on the plurality of phase differences such that outputs of a layer included in the machine learning module have a same dimension as the plurality of angles, and
combining the output of the layer and the plurality of angles; and
obtain a direction of arrival as an output of the machine learning module.

17. The non-transitory computer readable media of claim 16, wherein the plurality of angles are expanded by applying a multilayer perceptron (MLP) that shares weights between the plurality of angles.

\* \* \* \* \*